US008857125B2

(12) United States Patent
Lu et al.

(10) Patent No.: US 8,857,125 B2
(45) Date of Patent: Oct. 14, 2014

(54) WOOD FLOORING WITH SEALED JOINTS FOR TRUCK TRAILERS AND CONTAINERS

(75) Inventors: Ziqiang Lu, Red Wing, MN (US); Marc Chorney, Hastings, MN (US)

(73) Assignee: Industrial Hardwood Products, Inc., Red Wing, MN (US)

(*) Notice: Subject to any disclaimer, the term of this patent is extended or adjusted under 35 U.S.C. 154(b) by 0 days.

(21) Appl. No.: 13/534,631

(22) Filed: Jun. 27, 2012

(65) Prior Publication Data

US 2014/0000201 A1 Jan. 2, 2014

(51) Int. Cl.
*E04C 2/00* (2006.01)

(52) U.S. Cl.
USPC .......................................... 52/581; 52/588.1

(58) Field of Classification Search
USPC .......... 52/390, 578, 589.1, 581, 588.1, 585.2, 52/591.4
See application file for complete search history.

(56) References Cited

U.S. PATENT DOCUMENTS

| | | | |
|---|---|---|---|
| 3,111,569 A | 11/1963 | Rubenstein | |
| 4,212,405 A | 7/1980 | Schmidt | |
| 4,471,012 A | 9/1984 | Maxwell | |
| 4,703,948 A | 11/1987 | Ehrlich | |
| 4,810,027 A | 3/1989 | Ehrlich | |
| 4,881,859 A | 11/1989 | Ehrlich | |
| 4,913,485 A | 4/1990 | Moffatt et al. | |
| 4,958,472 A | 9/1990 | Ehrlich | |
| 4,969,659 A | 11/1990 | Ehrlich | |
| 5,083,834 A | 1/1992 | Moffatt et al. | |
| 5,152,228 A | 10/1992 | Donkin | |
| 5,218,794 A | 6/1993 | Ehrlich | |
| 5,221,103 A | 6/1993 | Ehrlich | |
| 5,255,952 A | 10/1993 | Ehrlich | |
| 5,283,102 A | 2/1994 | Sweet et al. | |
| 5,297,858 A | 3/1994 | Zupan | |
| 5,318,335 A | 6/1994 | Ehrlich | |
| 5,439,266 A | 8/1995 | Ehrlich | |
| 5,509,715 A * | 4/1996 | Scharpf | 52/408 |
| 5,536,036 A | 7/1996 | Ehrlich | |
| 5,537,931 A | 7/1996 | Donkin | |
| 5,538,330 A | 7/1996 | Ehrlich | |

(Continued)

FOREIGN PATENT DOCUMENTS

CA    2275848 A1    12/2000

OTHER PUBLICATIONS

"Non-Phthalate Plasticizer for Polyvinyl Acetate (PVAc) Emulsion Adhesives in Woodworking and Bookbinding", Eastman Chemical Company, Eastman TXIB™ formulation additive, L-AP241A 03/10, 2010.

(Continued)

*Primary Examiner* — Brian Glessner
*Assistant Examiner* — Paola Agudelo
(74) *Attorney, Agent, or Firm* — Seager, Tufte & Wickhem, LLC

(57) ABSTRACT

Floor boards and wood flooring for truck trailers and containers as well as methods for making and using the same are disclosed. An example wood floor for truck trailers and containers may include a wood member including a plurality of floor boards. Each of the floor boards may include a plurality of wood strips joined together. Opposing side surfaces of the wood strips may be attached together. Opposing end surfaces of the wood strips may be secured together with an end joint. The end joint may include a sealer disposed within the end joint.

12 Claims, 15 Drawing Sheets

(56) References Cited

U.S. PATENT DOCUMENTS

| | | | | |
|---|---|---|---|---|
| 5,562,981 | A | 10/1996 | Ehrlich | |
| 5,601,033 | A | 2/1997 | Ehrlich et al. | |
| 5,607,200 | A | 3/1997 | Smidler | |
| 5,622,115 | A | 4/1997 | Ehrlich et al. | |
| 5,664,826 | A | 9/1997 | Wilkens | |
| 5,685,228 | A | 11/1997 | Ehrlich et al. | |
| 5,730,485 | A | 3/1998 | Sjostedt et al. | |
| 5,730,578 | A | 3/1998 | Smidler | |
| 5,752,791 | A | 5/1998 | Ehrlich | |
| 5,752,798 | A | 5/1998 | Smidler | |
| 5,774,972 | A | 7/1998 | Ehrlich | |
| 5,832,836 | A | 11/1998 | Ehrlich et al. | |
| 5,860,693 | A | 1/1999 | Ehrlich | |
| 5,863,091 | A | 1/1999 | Shepherd et al. | |
| 5,876,089 | A | 3/1999 | Ehrlich | |
| 5,897,174 | A | 4/1999 | Ehrlich | |
| 5,928,735 | A * | 7/1999 | Padmanabhan et al. | 428/33 |
| 5,938,274 | A | 8/1999 | Ehrlich | |
| 5,952,076 | A | 9/1999 | Foster | |
| 5,997,076 | A | 12/1999 | Ehrlich | |
| 6,170,897 | B1 | 1/2001 | Karrer | |
| 6,179,942 | B1 * | 1/2001 | Padmanabhan | 156/153 |
| 6,183,824 | B1 * | 2/2001 | Padmanabhan et al. | 428/33 |
| 6,318,794 | B1 | 11/2001 | Berube | |
| 6,336,265 | B1 | 1/2002 | Niedermair | |
| 6,505,883 | B1 | 1/2003 | Ehrlich | |
| 6,558,765 | B2 | 5/2003 | Padmanabhan | |
| 6,558,766 | B2 * | 5/2003 | Padmanabhan et al. | 428/54 |
| 6,601,357 | B2 | 8/2003 | Tunis | |
| 6,607,803 | B2 | 8/2003 | Foster | |
| 6,662,424 | B2 | 12/2003 | Ehrlich | |
| 6,824,341 | B2 | 11/2004 | Ehrlich | |
| 6,843,877 | B2 | 1/2005 | Risi | |
| 6,870,473 | B2 | 3/2005 | Brown, Jr. | |
| 6,886,870 | B2 | 5/2005 | Ehrlich | |
| 6,920,721 | B2 | 7/2005 | Johns et al. | |
| 6,957,675 | B2 | 10/2005 | Risi | |
| 6,986,546 | B2 | 1/2006 | Ehrlich | |
| 7,069,702 | B2 | 7/2006 | Ehrlich | |
| 7,100,971 | B2 | 9/2006 | Pines | |
| 7,114,762 | B2 | 10/2006 | Smidler | |
| 7,134,820 | B2 | 11/2006 | Ehrlich | |
| D573,874 | S | 7/2008 | Thoma et al. | |
| 7,500,713 | B2 | 3/2009 | Riley et al. | |
| 7,527,309 | B2 | 5/2009 | Smidler | |
| 7,588,286 | B2 | 9/2009 | Lewallen et al. | |
| 7,637,558 | B2 | 12/2009 | Risi | |
| 7,677,642 | B2 | 3/2010 | Wylezinski | |
| 7,722,112 | B2 | 5/2010 | Ehrlich | |
| D619,505 | S | 7/2010 | Thoma et al. | |
| 7,762,618 | B2 | 7/2010 | Lewallen et al. | |
| 7,765,758 | B2 * | 8/2010 | Chorney et al. | 52/411 |
| 7,862,103 | B2 | 1/2011 | Riley et al. | |
| 7,878,574 | B2 | 2/2011 | Thoma et al. | |
| 7,926,524 | B2 | 4/2011 | Risi | |
| 7,931,328 | B2 | 4/2011 | Lewallen et al. | |
| 7,972,707 | B2 | 7/2011 | Padmanabhan | |
| 8,006,386 | B2 | 8/2011 | Ehrlich | |
| 8,016,527 | B2 | 9/2011 | Pattison et al. | |
| 8,025,331 | B2 | 9/2011 | Ehrlich et al. | |
| 8,029,880 | B2 | 10/2011 | Liu | |
| 8,079,793 | B2 | 12/2011 | Thoma et al. | |
| 8,091,952 | B2 | 1/2012 | Risi | |
| 8,100,465 | B2 | 1/2012 | Wylezinski | |
| 8,123,299 | B2 * | 2/2012 | Lin | 297/411.2 |
| 8,147,968 | B2 * | 4/2012 | Brady et al. | 428/425.1 |
| 8,341,916 | B2 * | 1/2013 | Sjoberg et al. | 52/592.4 |
| 8,399,544 | B2 * | 3/2013 | Varnell et al. | 524/25 |
| 2001/0003623 | A1 | 6/2001 | Padmanabhan et al. | |
| 2001/0035264 | A1 | 11/2001 | Padmanabhan | |
| 2003/0134080 | A1 | 7/2003 | Foster | |
| 2004/0031226 | A1 * | 2/2004 | Miller et al. | 52/588.1 |
| 2004/0031227 | A1 * | 2/2004 | Knauseder | 52/592.1 |
| 2004/0086334 | A1 * | 5/2004 | Kamarata | 404/6 |
| 2005/0266200 | A1 * | 12/2005 | Padmanabhan | 428/54 |
| 2006/0179733 | A1 | 8/2006 | Padmanabhan | |
| 2009/0193747 | A1 | 8/2009 | Chorney et al. | |
| 2009/0269522 | A1 | 10/2009 | Liu | |
| 2009/0280346 | A1 | 11/2009 | Risi | |
| 2010/0035015 | A1 * | 2/2010 | Green et al. | 428/106 |
| 2010/0075153 | A1 * | 3/2010 | Ni et al. | 428/425.1 |
| 2010/0295334 | A1 | 11/2010 | Chorney et al. | |
| 2011/0223328 | A1 | 9/2011 | Padmanabhan | |

OTHER PUBLICATIONS

Belleville et al., "Wood-Adhesive Interface Characterization and Modeling in Engineered Wood Flooring", Wood and Fiber Science, V. 40(4), Society of Wood Science and Technology, pp. 484-494, 2008.

HAVCO Wood Flooring, "Our Composite Flooring", Product Article from Havco Website at: http://www.havcowp.com/products/composite-flooring.

HAVCO Wood Flooring, "Laminated Flooring", Product Article from Havco Website at: http://www.havcowp.com/products/laminated-oak-flooring.

http://www.ttnews.com/articles/printopt.aspx?storyid=28148, Transport Topics Online, "Floor Makers Using New Materials, Designs to Meet Fleet Demands for Longer Trailer Life", Richard Knee, Special to Transport Topics, 4 pages, printed Feb. 17, 2012.

Motohashi et al., "Temperature Dependency of Bond Strength of Polyvinyl Acetate Emulsion Adhesives for Wood", Wood and Fiber Science, V. 16(1), Society of Wood Science and Technology, paper presented at 30th Annual Meeting of Japan Wood Research Society, pp. 72-85, Apr. 2, 1980.

Sellers, Jr., "Wood Adhesive Innovations and Applications in North America", Forest Products Journal, vol. 51, No. 6, p. 12-22, Jun. 2001.

* cited by examiner

WOOD FLOORING WITH SEALED JOINTS FOR TRUCK TRAILERS AND CONTAINERS

TECHNICAL FIELD

The present disclosure pertains to wood flooring. More particularly, the present disclosure pertains to wood flooring for truck trailers and containers.

BACKGROUND

Conventional truck trailers may utilize wood flooring, for example hardwood flooring, because of the desirable characteristics that the flooring may provide the trailer. For example, hardwood flooring may have a desirable level of strength and stiffness. This may give the flooring a long life and increase its wear resistance. Of the known wood floorings, each has certain advantages and disadvantages. There is an ongoing need to provide additional floorings and methods for making and using floorings.

BRIEF SUMMARY

The disclosure provides design, material, manufacturing method, and use alternatives for floor boards and/or wood floors for truck trailers and containers. An example wood floor for truck trailers and containers may include a wood member including a plurality of floor boards. Each of the floor boards may include a plurality of wood strips joined together. Opposing side surfaces of the wood strips may be attached together. Opposing end surfaces of the wood strips may be secured together with an end joint. The end joint may include a sealer disposed within the end joint.

An example method for manufacturing wood flooring for truck trailers and containers may include providing a plurality of wood strips including a first strip and a second strip, forming a first hook in a first end surface of the first strip, forming a second hook in a second end surface of the second strip, dispensing a sealer or joint sealer on the first hook with a dispensing system, and joining the first hook with the second hook to form a hook joint. The sealer may seal the hook joint.

Another example wood floor for truck trailers and containers may include a plurality of floor boards joined together. An underlay may be disposed along a bottom surface of the floor boards. Each of the floor boards may be made from a plurality of wood strips that are joined together. The plurality of wood strips may be bonded along their side surfaces. Opposing end surfaces of the wood strips may be secured together with a hook joint. A sealer may be disposed within the hook joint that seals the hook joint so that the hook joint is essentially impermeable to liquid water and water vapor.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
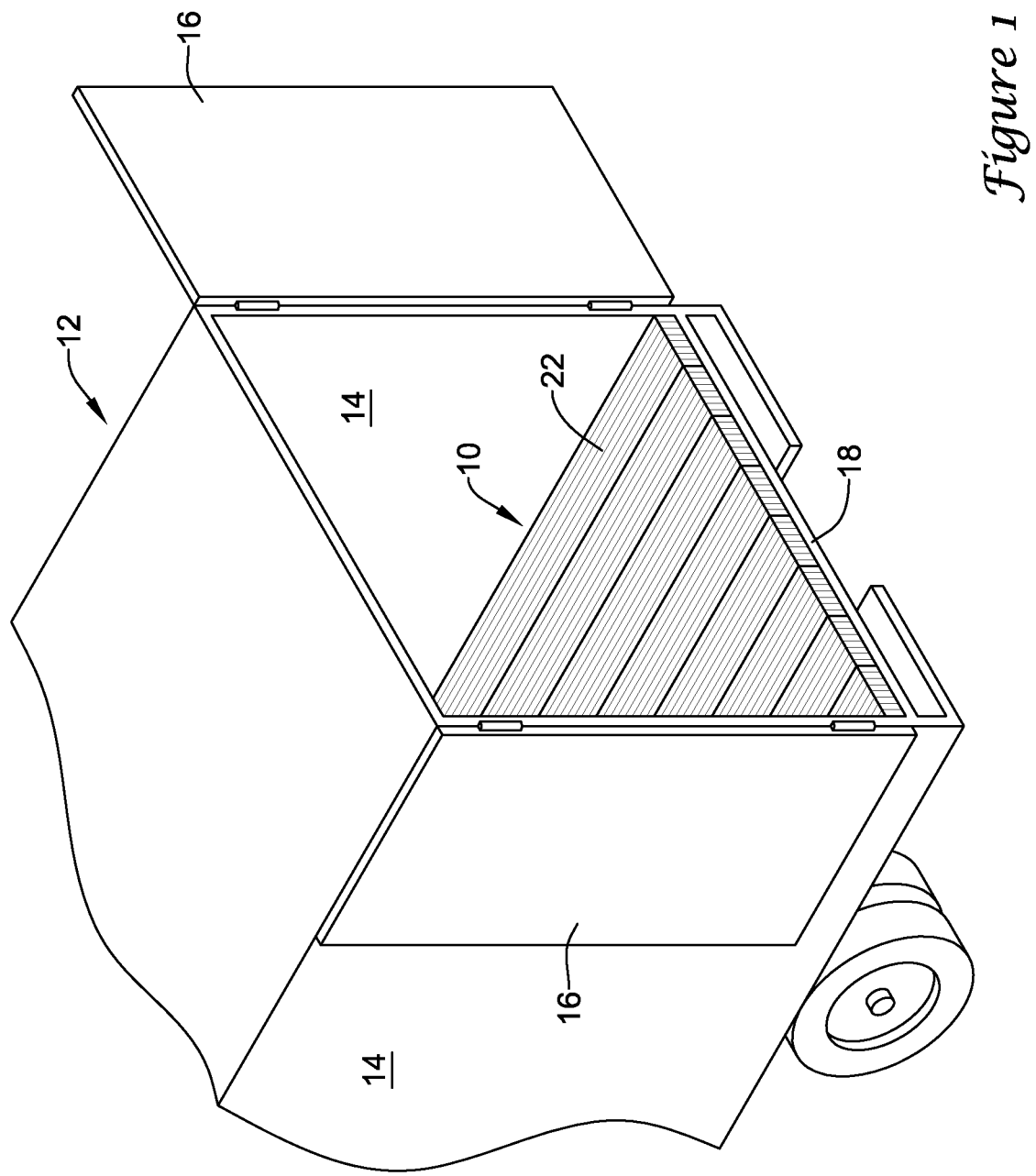
FIG. 1 is a plan overview illustrating an example wood floor disposed in a truck trailer.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The drawings, which are not necessarily to scale, depict illustrative embodiments and are not intended to limit the scope of the invention.

FIG. 1 is a plan view of an example wood flooring 10 disposed in a truck trailer 12. Although flooring 10 is illustrated within trailer 12, this is not intended to limit the invention as flooring 10 may be used, for example, with a number of different structures including containers (e.g., shipping and/or freight containers), railroad box cars, and the like, or any other suitable structure. Trailer 12 may be structurally similar to typical truck trailers. For example, trailer 12 may have a pair of opposing side walls 14 and end doors 16 that can open and close to provide access to the interior of trailer 12. In at least some embodiments, flooring 10 may extend across the width and along the length of the interior of trailer 12. Trailer 12 may have a plurality of support members 18 (e.g., "I" beams, "C" beams, hat sections, etc.) that each may have an upper flange or surface that crosses the width of trailer 12 and are spaced along the length of trailer 12. In some embodiments, flooring 10 may be secured to support member 18 by screws (not shown) or any other suitable fastener, which may penetrate through the whole thickness of flooring 10 and the upper flange of support members 18.

Flooring 10 may include one or more floorboards or wood members 22. Wood members 22 may take the form of a floor board of flooring component that is made from a suitable hardwood such as oak, maple (including sugar maple), ash, birch, beech, aspen, elm, poplar, apitong, kapur, para agnelim, and the like, or any other suitable hardwood. Hardwoods may be desirable, for example, due to their high strength, stiffness, and excellent durability. Alternatively, some softer woods may also be used, where appropriate.

Figure 2:
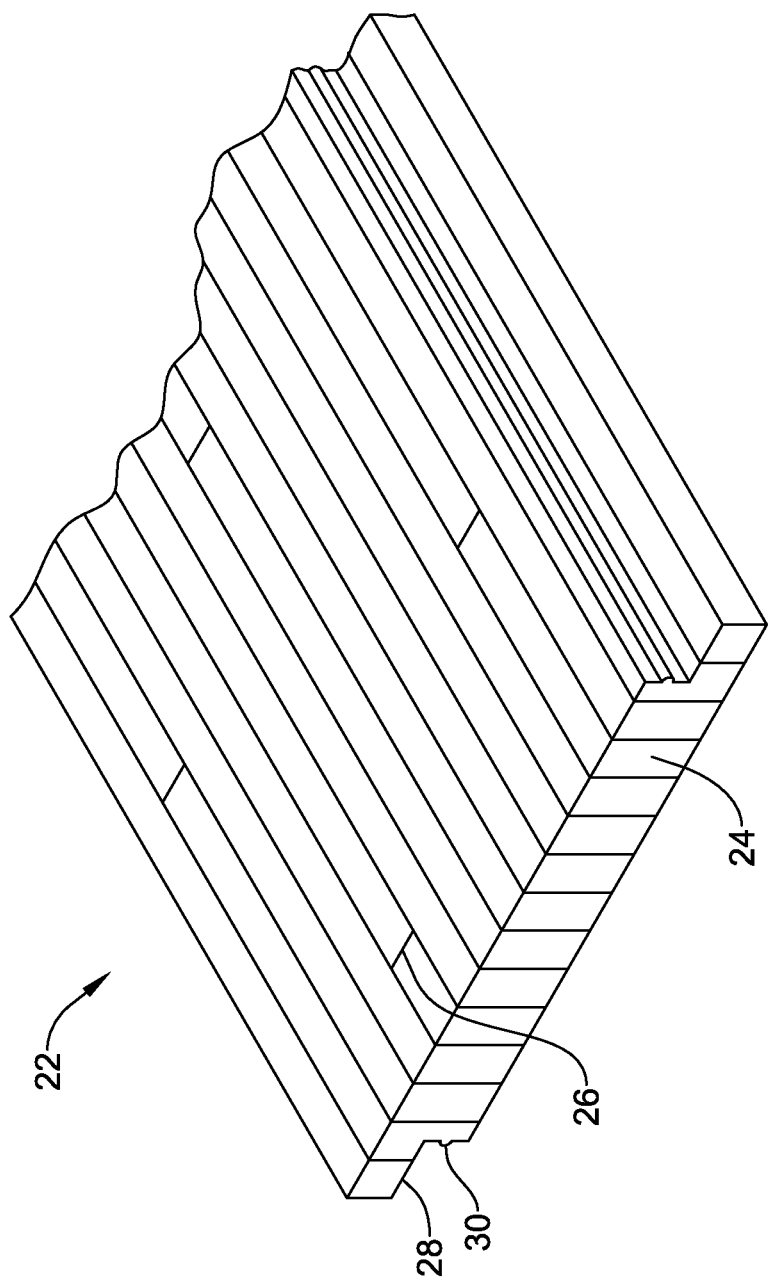
FIG. 2 is a perspective view of a portion of an example wood floor.

Each wood member 22 may include a plurality of wood strips 24 that are fastened together as shown in FIG. 2. For example, wood strips 24 may be arranged in a side-to-side and end-to-end manner in order to form wood members 22. To manufacture the individual strips 24, green (i.e., not dried) wood logs may be cut into lumber using conventional techniques. The lumber may be kiln-dried so that it has an equivalent moisture content of about 2 to 15% (e.g., about 6 to 10%). Alternatively, the lumber may be seasoned or otherwise allowed to dry to the desired moisture content. The dried lumber may be sanded and planed into the desired thickness. For example, the lumber may be sanded and planed so that it has a thickness of about 0.75 to 1.5 inches, or about 1 to 1.25 inches thick. The lumber may also be cut into the desired width, for example, using a ripsaw. For example, the lumber may be cut to have a width of about 0.75 to 2 inches, or about 1 to 1.4375 (i.e., 1$\frac{7}{16}$) inches wide. These are just examples.

During the manufacturing of strips 24, any wood defects such as knots, cracks and fractures, bark pockets, cavities and holes by insects, decay by fungi, and stains by molds may be removed by cutting off the defects with, for example, a chop saw or suitable automatic cutting system. It can be appreciated that such cutting may alter the length of strips 24. It may be desirable for minimum length of wood strips 24 to be about 12 inches in wood members 22. Overall, the average length of wood strips 24 may be between about three and three and one-half feet.

Both of the opposing ends of each wood strip 24 may be cut into a square shape with, for example, a tennoner saw. The squared ends of wood strips 24 may also be further cut so that end structures or "hooks" are formed therein. These hooks allow wood strips 24 to be attached end-to-end by mating adjacent hooks and forming an end or "hook" joint 26 as described in more detail below. The depth or size of hook joint 26 may vary depending on the application. For example, the depth of hook joints 26 may be about 0.25 to 0.75 inches, or about 0.25 to 0.5 inches, or about 0.375 inches. Alternatively, any other suitable type of joint may be utilized to join together wood strips 24. Some examples of the other joints contemplated are disclosed herein.

The suitably prepared wood strips 24 may also be fastened together side-to-side using any suitable attachment technique. For example, the vertical sides or edges of each wood strip 24 may be coated with an adhesive by a roller glue spreader. This may help secure wood strips 24 across the width of wood members 22. A suitable adhesive for this securing may include melamine urea formaldehyde, melamine formaldehyde, phenol formaldehyde, emulsion polymer isocyanate (EPI), crosslinking polyvinyl acetate, polyisocyanate, combinations thereof, and the like. The glue-coated wood strips 24 may be assembled (e.g., both side-to-side and end-to-end) on a conveyor. This may include manual assembly. The hook joints 26 may fasten together the adjacent ends of strips 24 to form a continuous slab, in which they are jointed end-to-end in a number of rows (as illustrated in FIG. 1). It may be desirable to control the number of hook joints 26 per square foot. For example, it may be desirable to have about 5 to 7 hook joints 26 per square foot on average. The joined collection of wood strips 24 may be placed into a steam or radio frequency hot press under vertical and cross-direction pressures for curing of the adhesive.

Once strips 24 are secured together in the desired fashion, the resultant board may be cut to the desired length. For example, the board may be cut to a length of about 56 feet (or more or less depending on the application). Additionally, the board may also be divided into a number of floorboards or wood members 22 that each has a width, for example, of about 10 to 14 inches or about 12 inches to 12.25 inches. These wood members 22 may be planed (and/or sanded) to a desired thickness. For example, wood members 22 may be planed to a thickness of about 1 to 1.5 inches, or about 1.125 inches, or about 1.3125 inches, or about 1.375 inches, etc.

Trailers like trailer 12 may include a plurality of wood members 22 joined together to form flooring 10. For example, trailer 12 may include about 6 to 10 wood members 22, or about 8 wood members 22, or more or less depending on the application. To facilitate the joining of wood members 22, shiplaps 28 and crusher beads 30 (as shown in FIG. 2), which may be similar to those known in the art, may be machined on to both edges of each wood member 22. Shiplaps 28 may be convenient for installing floorboards on truck trailers by allowing adjacent wood members 22 to overlap. Crusher beads 30 may provide spaces between adjacent wood members 22, which may protect members 22 from buckling due to their expansion in wet conditions.

Figure 3:
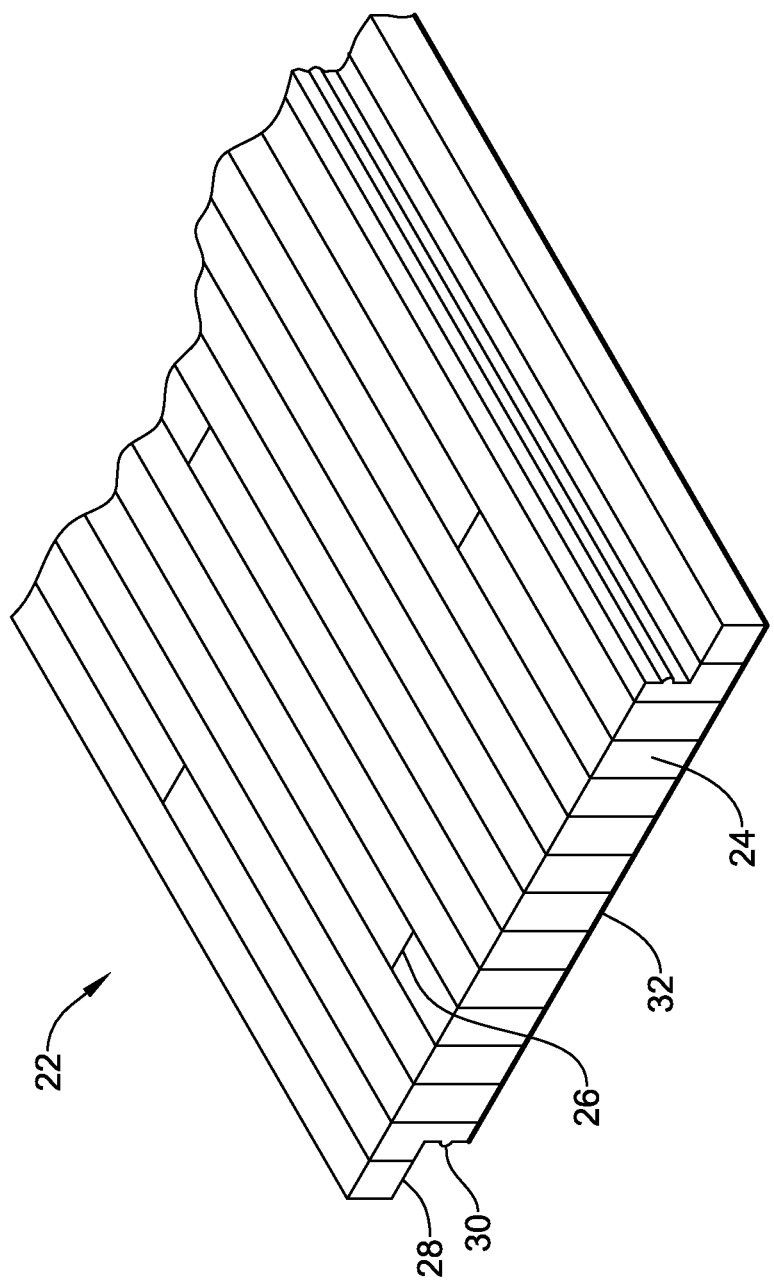
FIG. 3 is a perspective view of a portion of an example wood floor with an undercoating or a moisture barrier.

As may be expected, the underside of flooring 10 may be exposed to the environment during use. For example, the underside of flooring 10 may be exposed to moisture (e.g., rain, snow, ice, etc.), road debris, dirt, and the like, which may shorten the lifespan of flooring 10. Accordingly, wood members 22 may include an undercoating or underlay 32 attached to the bottom surface thereof as shown in FIG. 3. In at least some embodiments, underlay 32 may provide a moisture barrier. Underlay 32 may be a coating, layer of latex, reinforced underlay (e.g., fiber reinforced plastic), film, or the like.

Figure 4:
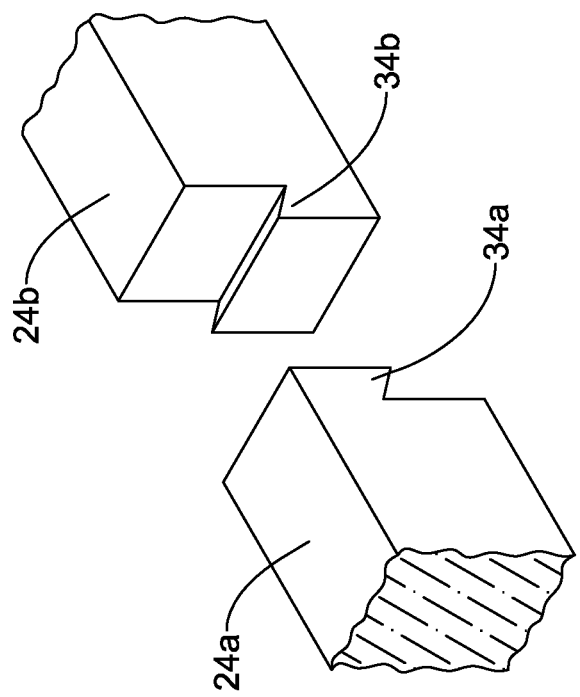
FIG. 4 is perspective view of a pair of wood strips with hooks formed in their end surfaces.
Figure 5:
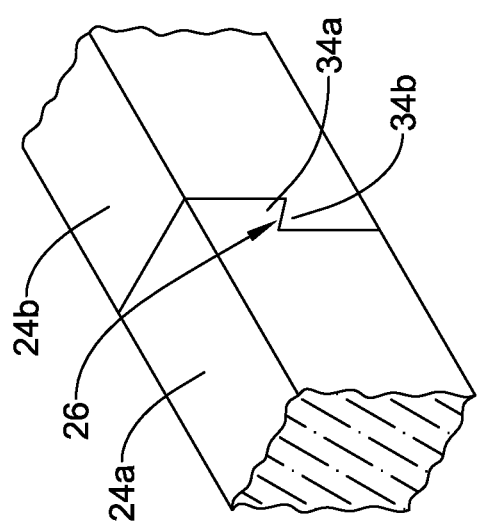
FIG. 5 is a perspective view of a hook joint.

While sealing or protecting the bottom of wood members 22 may help extend the lifespan of flooring 10, environmental exposure and/or moisture exposure can pose challenges at other portions of flooring 10. For example, FIG. 4 illustrates a pair of example wood strips 24a/24b, each with a hook 34a/34b formed therein. Hooks 34a/34b may be brought together mechanically in a mating relationship to define joint 26 (e.g., "hook" joint 26) as shown in FIG. 5. While hook joints 26 are mechanically joined (in at least some instances with relatively tight tolerances) and can resist ingress of moisture, these bond points may be a location where moisture can access wood members 22, potentially leading to degradation of flooring 10. In addition, when underlay 32 is utilized for flooring 10, underlay 32 can delaminate from wood members 22 along joints including adjacent to hook joints 26. The present disclosure provides alternative end or "hook" joints 26 for wood members 22 with a sealer or sealing material that may seal joints 26 so as to provide a suitable moisture barrier, reduce delamination of underlay 32, as well as provide additional benefits.

Figure 6:
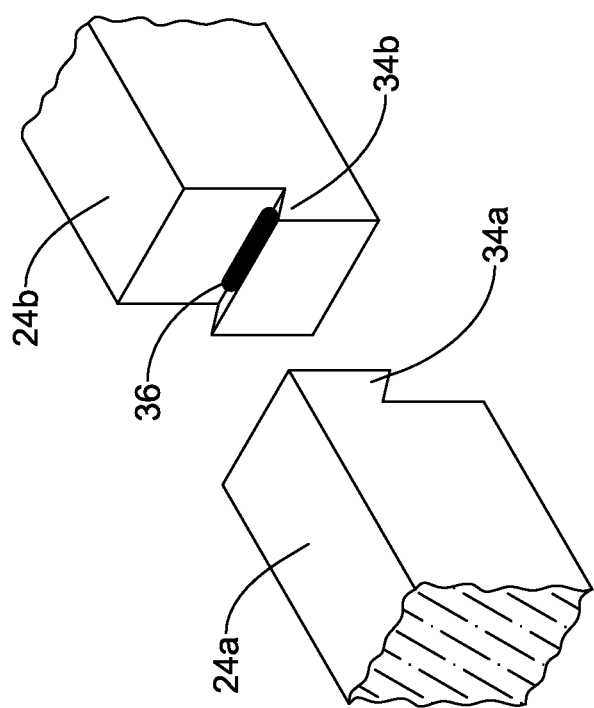
FIG. 6 is a perspective view of a pair of wood strips with hooks formed in their end surfaces, where a sealer is disposed on one of the hooks.
Figure 7:
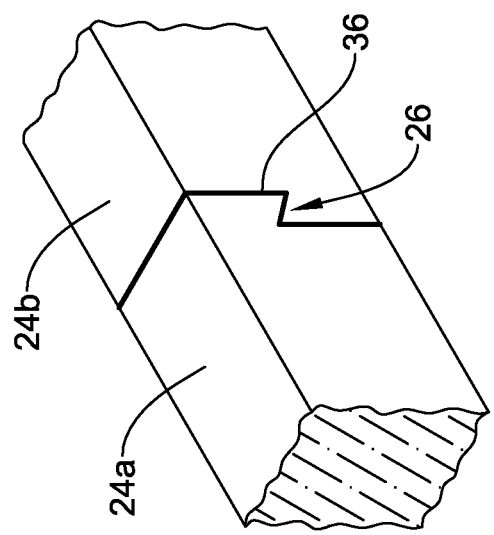
FIG. 7 is a perspective view of a sealed hook joint.

FIG. 6 illustrates wood strips 24a/24b. In this example, a sealer or sealing material 36 may be applied to or otherwise disposed on a portion of one of the hooks (in this example, sealer 36 is disposed along hook 34b). When hooks 34a/34b are joined together, the sealer 36 "seals" the hook joint 26 as shown in FIG. 7.

In at least some embodiments, sealer 36 may be a thermoplastic polymer adhesive, a thermosetting-based polymeric adhesive, or a combination thereof, and sealer 36 may be utilized to block a water or moisture path along the profile of hook joint 26 or other wood joints and avoid the intrusion of moisture into the trailer cargo. Sealer 36 may bond tightly with wood in each hook joint section. Moreover, the sealer itself may also have an excellent water resistance and meet the requirements for exterior applications of the resultant trailer flooring.

The form and/or material composition of sealer 36 can vary. In at least some embodiments, sealer 36 may include a two-part emulsion polymer isocyanate (EPI). According to this embodiment, sealer 36 may be applied/dispensed using an adhesive dispersing system or an injection die head under a pressure. For the purposes of this disclosure, EPI may be understood to be a two-component adhesive formed by reacting water-based emulsion polymer latex such as styrene-butadiene rubber (SBR) latex, ethylene vinyl acetate (EVA), polyvinyl acetate (PVAc), acrylonitrile butadiene rubber (NBR) latex, acrylic latex, styrene acrylics, or a combination comprising at least one of the above compounds with an isocyanate hardener (or crosslinker). Because the components/ingredients of EPI and their mixing ratios may vary significantly (and various hardeners may be used), the resultant adhesive may be different in molecular weight, pH value, viscosity, set time, open time, curing time, and the like. In at least some embodiments, an isocyanate hardener may include methylene diphenyl diisocyanate (MDI). MDI is an aromatic diisocyanate, existing in three isomers, 2,2'-MDI, 2,4'-MDI, and 4,4'-MDI. Some suitable isocyanate hardeners may include hexamethylene diisocyanate (HDI), toluene diisocyanate (TDI), isophorone diisocyanate (IPDI), naphthalene diisocyanate (NDI), dodecamethylene diisocyanate, tetramethylene diisocyanate, and the like. Similarly, TDI may exist in two isomers, 2,4-TDI and 2,6-TDI. Other suitable isocyanate hardeners may mainly come from the diisocyanate derivatives such as 1,4-diisocyanatocyclohexane, 1-isocyanato-3,3,5-trimethyl-5-isocyanatomethyl-cyclohexane, 4,4'-diisocyanatodicyclohexylmethane, 4,4'-diisocyanato-2,2-dicyclohexylpropane, 1,4-diisocyanatobenzene, 2,6-diisocyanatodiphenylmethane, 4,4'-diisocyanato-2,2-diphenylpropane, 4,4'-diisocyanatodiphenylpropane-(2,2), p-xylylene diisocyanate, $\alpha,\alpha$, $\alpha',\alpha'$-tetramethyl-m or p-xylylene diisocyanate, combinations thereof, and the like. These are just examples.

EPI may provide a desirable resistance to moisture ingress and may provide desirable heat resistance. EPI is classified as a "Type I" (waterproof) adhesive (or as D4 by European standard EN 204), suitable for exterior applications like truck trailer flooring. Because EPI is a water-based adhesive, it can be easily applied at hook joint 26 with an adhesive dispensing system (e.g., the dispensing apparatus disclosed herein, an injecting die under a pressure, or the like). In addition, EPI can be easily cleaned off from the dispensing system or the die after application.

In at least some embodiments, the ratio of the two components of the two-part sealer material 36 can vary. For example, the ratio (e.g., the ratio of the amount of the water-based emulsions of SBR, EVA, and PVAc to the amount of the isocyanate hardener or crosslinker) may be in the range of about 1:1 to 20:1.

Sealer 36 can include alternative materials including, for example, melamine urea formaldehyde (MUF), melamine formaldehyde (MF), phenol formaldehyde (PF), resorcinol formaldehyde (RF), phenol resorcinol formaldehyde (PRF), crosslinking polyvinyl acetate (XPVAc or x-PVAc), polyisocyanate such as polymeric methylene diphenyl diisocyanate (pMDI), polyurethane, epoxy, acrylic, silicone, polysulfide, sylil-terminated polyether or polyether and acrylic sealants, combinations thereof, and the like. These are just examples.

In at least some embodiments, sealer 36 can be a mixture of two or multiple adhesive resins such as EPI/MUF, EPI/MF, EPI/XPVAc, MUF/XPVAc, MF/XPVAc, MUF/XPVAc/EPI, MF/MUF/XPVAc, respectively. Alternatively, EPI may also be blended with a Type II (water resistant) or Type III (not water resistant) adhesive such as urea formaldehyde (UF), PVAc, or the like. The resultant glue mixture should meet the type I adhesive requirement for exterior applications, in which the Type II or Type III adhesive may be 40% or less of the weight of EPI. These are just examples.

In at least some embodiments, wood flours may be used as a rheology modifier or a thickener for sealer 36. In at least some embodiments, suitable species for wood flour may include alder, ash, aspen, basswood, beech, birch, butter nut, cherry, chestnut, cottonwood, elm, hackberry, pecan hickory, true hickory, honeylocust, locust, magnolia, maple, oak, red oak, white oak, sassafras, sweetgum, sycamore, tanoak, tupelo, walnut, willow, yellow poplar, baldcypress, cedar, Douglas-fir, fir, hemlock, larch, pine, redwood, spruce, tamarack, and the like. The wood may also include imported species such as afrormosia, albarco, andiroba, angelin, angelique, avodire, azobe, balsa, banak, benge, bubinga, bulletwood, cativo, ceiba, courbaril, cuangare, Mexican cypress, degame, determa, ekop, goncalo alves, greenheart, hura, ilomba, ipe, iroko, jarrah, jelutong, kaneelhart, kapur, karri, kempas, keruing, lignumvitae, limba, macawood, African mahogany, true mahogany, manbarklak, manni, marishballi, merbau, mersawa, mora, oak, obeche, okoume, opepe, ovangkol, para-angelim, para-pine, pau marfim, peroba de campos, peroba rosa, pilon, Caribbean pine, ocote pine, radiata pine, piquita, primavera, purpleheart, ramin, robe, Brazilian rosewood, Indian rosewood, sande, Santa maria, sapele, sepetir, shorea (including lauan-meranti group), Spanish-cedar, sucupira, teak, tornillo, wallaba, and the like. These are just examples.

In at least some embodiments, sealer 36 may also include a non-wood filler material and/or non-wood flour. Some examples of non-wood flours that may be included with sealer 36 include soybean flour, wheat flour, oat hull flour, corn flour, corncob flour, coconut flour, pecan shell flour, starch, and so on. Other wood and non-wood flours (e.g., which can be from ground natural or synthetic fibers) may also be included with sealer 36 such as wood fiber, cellulose fiber, reeds, bamboo, papyrus, jute fiber, hemp fiber, kenaf fiber, flax seed fiber, sugarcane bagasse fiber, sisal fiber, abaca fiber, henequen fiber, wheat stalk/chaff, corn stalk, sorghum stalk, cotton stalk, rice straw, wheat straw, oat straw, barley straw, rye straw, flax straw, grass straw, coconut coir, rice husks, peanut hull, cotton linters, Esparto grass, sabai grass, pulp, nitrocellulose, and the like. The mesh size for the non-wood filler material and/or wood flours may be in the range of about 20 to 200 meshes. The amount of non-wood filler material and/or wood flours included with sealer 36, if used at all, may be about 1 to 50% or less by weight or about 2 to 44% or less by weight.

In at least some embodiments, inorganic or mineral fillers may also be included to adjust the viscosity of adhesive fillers. Such materials may desirably increase the wearing resistance and hardness of the resultant adhesives. Moreover, the inclusion of fillers may help reduce the cost of sealer 36. Some examples of suitable inorganic fillers may include calcium carbonate ($CaCO_3$), magnesium carbonate ($MgCO_3$), silicon dioxide ($SiO_2$), aluminum oxide ($Al_2O_3$), sodium oxide ($Na_2O$), potassium oxide ($K_2O$), calcium oxide (CaO), iron oxide ($Fe_2O_3$), magnesium oxide (MgO), titanium dioxide ($TiO_2$), and the like. The inorganic fillers may also include mixtures of the above inorganic compounds. The examples may include talc [$Mg_3Si_3O_{10}(OH)_2$], kaolin [$Al_2Si_2O_5(OH)_4$], gypsum, clays, and the like. In addition, some inorganic minerals like $Fe_2O_3$ and $TiO_2$ may also be used as a colorant or pigment in adhesives. The amount of inorganic fillers used for sealer 36 may be about 1 to 20% or so by weight (e.g., 1 to 10% or so by weight). These are just examples.

In at least some embodiments, sealer 36 may include a relatively small fraction of pH buffer, which may be used to maintain the pH value of EPI to be 6.0 to 8.5 or so. Some examples of commercially available pH buffer solutions may include 2-(N-morpholino) ethanesulfonic acid (MES), 3-(N-morpholino)propanesulfonic acid (MOPS), 3-{[tris(hydroxymethyl)methyl]amino}propanesulfonic acid (TAPS), 3-[N-Tris(hydroxyl methyl) methylamino]-2-hydroxypropanesulfonic acid (TAPSO), acetic acid, citric acid, dimethylarsinic acid (Cacodylate), dipotassium phosphate ($K_2HPO_4$), disodium phosphate ($Na_2HPO_4$), monopotassium phosphate ($KH_2PO_4$), monosodium phosphate ($NaH_2PO_4$), N-tris(hydroxymethyl)methylglycine (Tricine), piperazine-N,N'-bis(2-ethanesulfonic acid) (PIPES), sodium acetate, sodium citrate, saline sodium citrate (SSC), tris(hydroxymethyl)methylamine (Tris), and the like. These are just examples. The pH buffers used for sealer 36 generally are selected so that they do not react with the isocyanate catalyst and/or do not interfere with the crosslinking reaction of EPI.

In at least some embodiments, sealer 36 may also include a mildewcide, fungicide, and/or insecticide such as 3-Iodo-2 propynyl butyl carbamate, 2-(thiocyanomethylthio)benzothiazole/methylenebis-thiocyanate, 3-iodo-2-propynyl butyl carbamate/chlorpyrifos, alkyl dimethyl benzyl ammonium chloride, alkyl dimethyl ethylbenzyl ammonium chloride, ammoniacal-zinc oxide, azaconazole, bis(tri-N-butyltin oxide)/quaternary amine, calcium borate, coco imidazoline benzyl chloride, copper naphthenate, copper-8-quinolinotate, copper triazole, cypermethrin, deltamethrin, dialkyldimethyl ammonium chloride, didecyl dimethyl ammonium chloride, didecyl dimethyl ammonium chloride/3-iodo-2-propynyl butyl carbamate, imidacloprid, permetrin, propiconazole, sodium pentachlorophenate, tebuconazole, zinc borate, zinc chloride, zinc naphthenate, zinc oxide, or the like (e.g., about 0.2-10% or about 1-4% or so by weight) in sealer 36. These are just examples.

In some of these and other embodiments, a colorant or pigment such as carbon black, SYN-OX HB-1034 and/or HB-1094 (commercially available from Hoover Color, Hiwassee, Va.), and titanium dioxide (commercially available from Lansco Colors, Pearl River, N.Y.) may be included. Other colorants that may be used may include those commercially available from BASF (Florham Park, N.J.) including CIBA CROMOPHTAL Blue 4GNP, CROMOPHTAL Brown 5R, IRGALITE green GFNP, IRGALITE blue BLPO, IRGALITE black 2B-LN, or the like), combinations thereof, or the like. The colorant amount may be about 0.1 to 6% or so by weight (e.g., 0.1 to 4% by weight). These are just examples.

Sealer 36 may also be selected so as to have additional features and/or characteristics. For example, in at least some embodiments, sealer 36 may have any overall viscosity in the range of about 1,000 to 1,200,000 cps at room temperature. The open time for sealer 36 (e.g., the amount of time that sealer 36 is allowed to set before bringing hooks 34 into contact) may be in the range of about 10 to 120 minutes and the set time for sealer 36 (e.g., the amount of time that sealer 36 is allowed to set after bringing hooks 34 into contact) may be in the range of about 3 to 60 minutes. These are just examples.

Figure 8:
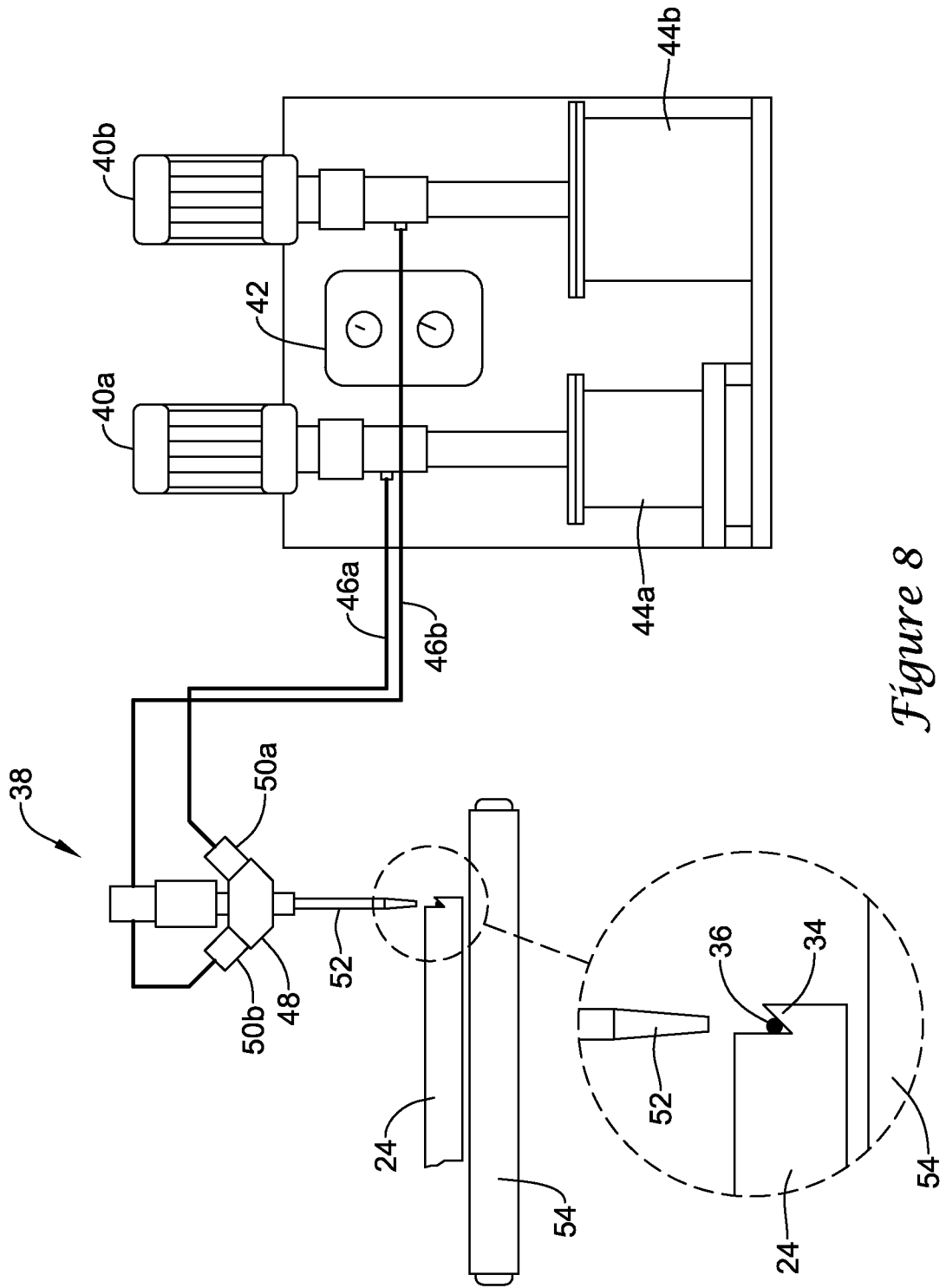
FIG. 8 illustrate an example method for manufacturing a wood floor with sealed hook joints.

FIG. 8 illustrates an example method for forming sealed hook joints 26. For example, a dispensing apparatus 38 may be used to dispense sealer 36 onto wood members 22 (e.g., along or otherwise adjacent to hooks 34). Other dispensing systems may also be used. For example, an injection die may be used as a dispensing system for dispensing sealer 36 onto wood members 22. Other suitable dispensing systems may also be utilized.

In at least some embodiments, while performing the process, a user can monitor progress and/or alter the process at a user dashboard 42. Dispensing apparatus 38 may include one or more structures such as pumps/motors 40a/40b. Dispensing apparatus 38 may include one or more pails or tanks 44a/44b (e.g., of any suitable capacity, depending on the volume required) that can be used to supply sealer 36. In embodiments that utilize EPI as sealer 36, pail 44a may include an isocyanate hardener. Pail 44b may include an emulsion of SBR latex, EVA, PVAc, NBR latex, acrylic latex, styrene-acrylics, or a combination comprising at least one of the above compounds, and the like. It can be appreciated that in embodiments where sealer 36 is a one-part adhesive material, dispensing apparatus 38 only needs to include a single supply pail.

Motors 40a/40b may pump or otherwise be used to transport the materials disposed in pails 44a/44b along outlets or hoses 46a/46b, through valves 50a/50b, and to a mixer 48. Here, the components of sealer 36 can be mixed or otherwise readied for dispensing onto hook 34 of wood strip 24. A conveyor or transporting structure 54 may be used to move or transport each wood strip 24 to a suitable position so that the sealer 36 can be dispensed through a dispensing head 52 and onto, for example, a "valley" of hook 34. In at least some embodiments, a bead or suitable quantity of sealer 36 (e.g., in the range of about 0.05 to 15 grams, or about 0.1 to 10 grams, or about 0.2 to 5 grams) is dispensed onto the valley of hook 34 on wood strip 24. The amount of sealer 36 dispensed may be adjusted so as to reduce the amount squeezing out from joint 26. A pair of wood strips 24 can be joined together by bringing their respective hooks 34 into contact. Once joined, sealer 36 can be cured (e.g., with heat) or otherwise allowed to dry or cure under room conditions so as to seal joints 26. Other processes may also be utilized including bonding adjacent wood strips 24 along their opposing side surfaces.

Figure 9:
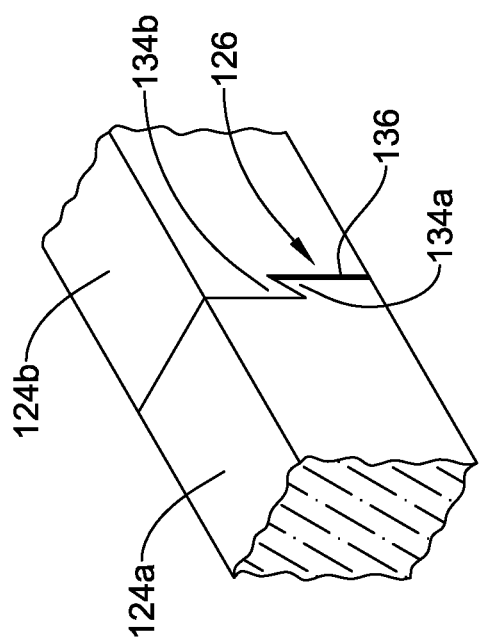
FIG. 9 is a perspective view of an example partially sealed hook joint.
Figure 10:
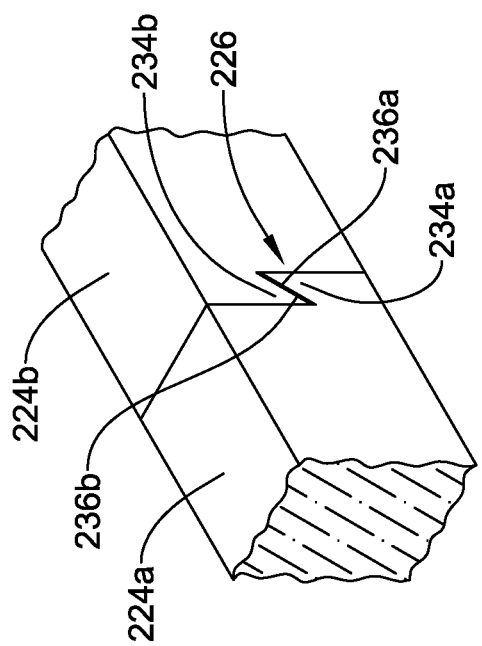
FIG. 10 is a perspective view of another example partially sealed hook joint.

While sealed hook joints 26 are disclosed herein, the present disclosure is not intended to be limited as a variety of joints (e.g., end joints) are contemplated. FIGS. 9-15 illustrate some examples of the end joints contemplated. For example, FIG. 9 illustrates wood strips 124a/124b with hooks 134a/134b joined in hook joint 126. Sealer 136 is disposed along a portion of hook joint 126. In this example, hook joint 126 may be described as partially sealed [e.g., where a bottom and/or top portion of hook joint 126 (i.e., the vertical walls adjacent to hooks 134a/134b of wood strips 124a/124b) is sealed at joint 126 to house sealer 136], while sealer 136 may be expanded to some area of the middle portions of wood strips 124a/124b at hooks 134a/134b during the assembly and hot pressing processes. FIG. 10 illustrates wood strips 224a/224b with hooks 234a/234b joined in hook joint 226. Sealer 236 is disposed onto a portion of hook joint 226. In this example, hook joint 226 may be only sealed in the middle portion (e.g., where the middle portions of wood strips 224a/224b adjacent to hooks 234a/234b of hook joint 226 are bonded together with sealer 236). In addition, some of the sealer 236 may be squeezed out from the middle portions of wood strips 224a/224b adjacent to hooks 234a/234b of hook joint 226 and further fills some area of the vertical walls at hooks 234a/234b due to the vertical and cross-section pressure by a hot press.

Figure 11:
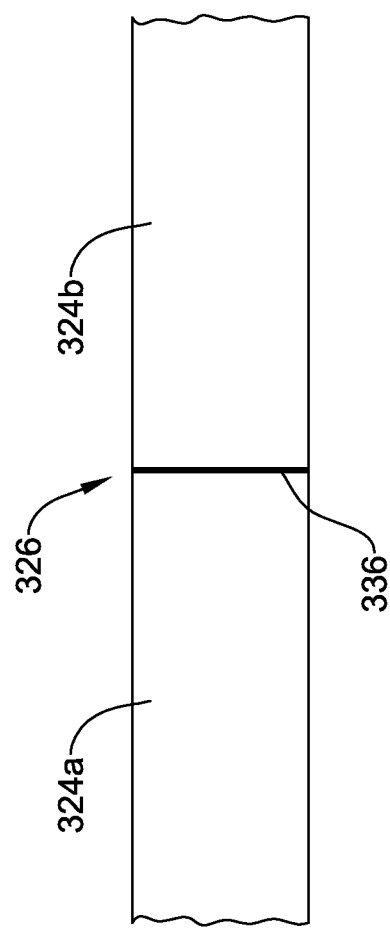
FIG. 11 is a perspective view of an example sealed butt joint.
Figure 12:
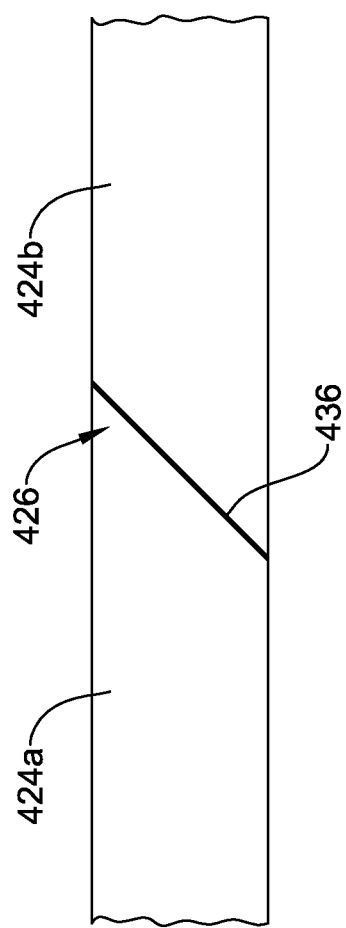
FIG. 12 is a perspective view of an example sealed scarf joint.
Figure 13:
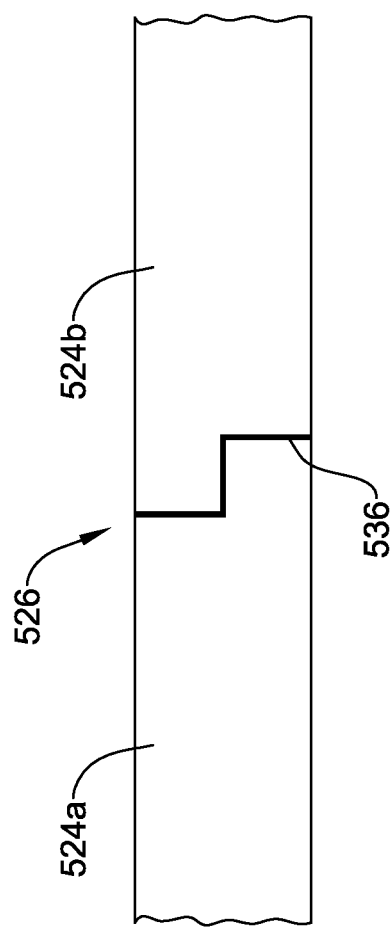
FIG. 13 is a perspective view of an example sealed lap joint.
Figure 14:
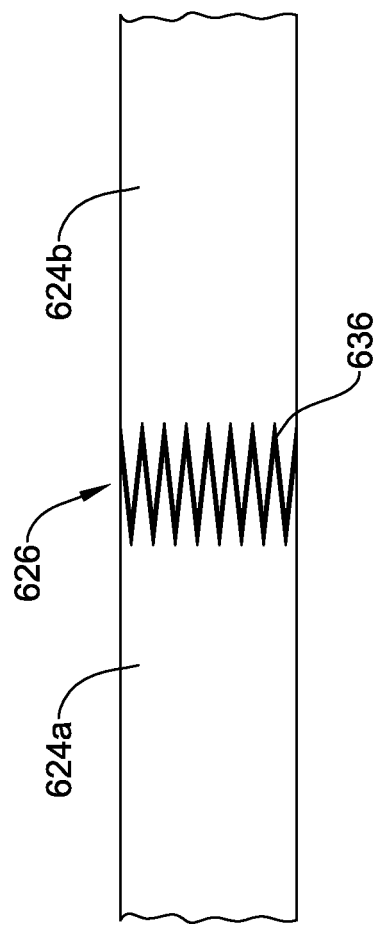
FIG. 14 is a perspective view of an example sealed finger joint.
Figure 15:
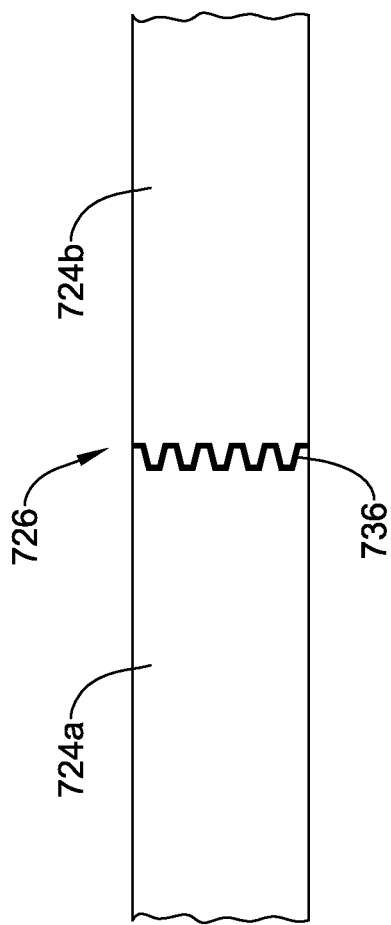
FIG. 15 is a perspective view of an example sealed gear tooth joint.

Additional joints can be seen in FIGS. 11-15. For example, FIG. 11 illustrates wood strips 324a/324b joined with a butt joint 326. Sealer 336 is disposed at joint 326, which seals joint 326. FIG. 12 illustrates wood strips 424a/424b joined with a scarf joint 426. Sealer 436 is disposed at joint 426, which seals joint 426. FIG. 13 illustrates wood strips 524a/524b joined with a lap joint 526. Sealer 536 is disposed at joint 526, which seals joint 526. FIG. 14 illustrates wood strips 624a/624b joined with a finger joint 626. Sealer 636 is disposed at joint 626, which seals joint 626. FIG. 15 illustrates wood strips 724a/724b joined with a gear tooth joint 726 (i.e., a modified finger joint). Sealer 736 is disposed at joint 726, which seals joint 726. In addition, variations and/or modifications to these joints are contemplated. For example, in embodiments that utilize hook joint 26 (or a modified hook joint) and finger joint 626 (or gear tooth joint 726), respectively, any suitable number of end joint/modified end joint may be utilized without departing from the spirit of the invention. Other variations in shape, number, arrangement, and the like are also contemplated.

EXAMPLES

The invention may be further clarified by reference to the following Examples, which serve to exemplify some of the preferred embodiments, and not to limit the invention in any way.

Example 1

An example sealer 36 was made that included 100 parts EPI (Henkel Corporation, Rocky Hill, Conn.), 17.7 parts hardener (Dorus R 410, Henkel Corporation, Rocky Hill, Conn.), and 11.8 parts oak flour (100 in mesh size, American Wood Fibers, Columbia, Md.).

Example 2

An example sealer 36 was made that included 100 parts EPI (Henkel Corporation, Rocky Hill, Conn.), 17.7 parts hardener (Dorus R 410, Henkel Corporation, Rocky Hill, Conn.), 11.8 parts oak flour (100 in mesh size, American Wood Fibers, Columbia, Md.), and 0.6 part carbon black (Evonik Degussa Corporation, Parsippany, N.J.).

Example 3

An example sealer 36 was made that included 100 parts EPI (Henkel Corporation, Rocky Hill, Conn.), 17.7 parts hardener (Dorus R 410, Henkel Corporation, Rocky Hill, Conn.), 11.8 parts calcium carbonate filler (Great Lakes Calcium Corporation, Green Bay, Wis.), and 0.6 part carbon black (Evonik Degussa Corporation, Parsippany, N.J.).

Example 4

An example sealer 36 was made that included 50 parts EPI/hardener (Henkel Corporation, Rocky Hill, Conn.), 50 parts MUF (BTLSR Toledo, Toledo, Ohio), 10 parts oak flour (100 in mesh size, American Wood Fibers, Columbia, Md.), and 0.5 part carbon black (Evonik Degussa Corporation, Parasippany, N.J.).

Example 5

An example sealer 36 was made that included 50 parts EPI/hardener (Henkel Corporation, Rocky Hill, Conn.), 50 parts MUF (BTLSR Toledo, Toledo, Ohio), 10 parts calcium carbonate filler (Great Lakes Calcium Corporation, Green Bay, Wis.), and 0.5 part carbon black (Evonik Degussa Corporation, Parasippany, N.J.).

Example 6

Preparation of Floorboard Samples

Nine oak floorboard samples were prepared for testing. In each sample, three oak strips (2.8 inches wide by 10.5 inches long by 1⁵⁄₁₆ inches thick) were joined together along their side surfaces with MUF. A hook joint was disposed in the center strip. Sample oak floorboards were prepared using either no sealer at the hook joint or the example sealer from Examples 1 to 5 at the hook joint for testing. When utilizing the sealer, the preparation also included disposing the example sealer 36 at the hook joints, allowing the sealer 36 to set for 10 minutes under room conditions, and then the floorboard assemblies were pressed in a lab press at a temperature of 300° F. for 10 minutes. After pressing, the resultant floorboard samples were placed at room temperature for 72 hours.

Water Penetration Test

During the water penetration test, a pressure vessel was mounted with its clamp on the hook joint of an oak floorboard sample. Water was added into the chamber of the pressure vessel. The chamber was closed tightly with a valve. Compressed air connected to the chamber was then turned on. The water pressure was gradually increased from 0 psi until it reached the maximum pressure of 40 psi. The test was stopped when the hook joint started leaking. All the tested samples were further evaluated for wet shear performance (disclosed below).

The sample oak floorboards using the example sealer material from Examples 1 to 5 withstood (e.g., did not leak) water pressures of 40 psi. Conversely, unsealed hook joints leaked immediately at 0 psi.

Hook joint sections of standard oak trailer flooring in the market normally have a water leaking rate of 90% or higher. By using the example sealers, the water leaking rate can be significantly reduced (e.g., the leak rate may be reduced and may approach 0%).

Wet Shear Test

The wet shear performance of the sample oak floorboards were evaluated in accordance with the Fruehauf industry standard. After the wet penetration test, all of the samples were cut into 2-inch long shear blocks, in which hook joint was located at the center of each sample. The wet shear block samples were initially immerged in water (at room temperature) and soaked for 48 hours. The samples were then dried in an oven at a temperature of 140° F. for 8 hours and then subsequently soaked in water for another 16 hours. These cycles were then repeated a second time. Subsequently, all of the shear block samples were removed from water and placed at room temperature for one hour prior to the performance of a shear test with a universal test machine.

The sample oak floorboards with the example sealer had an average wet shear strength higher than those without any sealer. The sample oak floorboards utilizing the sealer from Example 3 were slightly higher in shear strength than those without any filler, while the sample oak floorboards utilizing the sealer from Example 1 improved the wet shear strength of the resultant floorboards by 17% (when compared to those without the sealer). The results of the wet shear testing data is presented in Table 1.

TABLE 1

Wet Shear Strength of Floorboard Samples

| Test sample | Adhesive Filler | Board Length (inches) | Average Board Width (inches) | Average Board Thickness (inches) | Average Load at Failure at the hook joint (pounds) | Average Shear Strength at the hook joint (pounds per square inch) |
|---|---|---|---|---|---|---|
| Control floorboard (no sealer at the hook joint) | No | 2 | 2.8 | 1.44 | 2,677 | 985 |
| Sample floorboard with sealed hook joint (hook joint with example sealer from Example 1) | Yes | 2 | 2.8 | 1.44 | 3,446 | 1,188 |
| Sample floorboard with sealed hook joint (hook joint with example sealer from Example 3) | Yes | 2 | 2.8 | 1.44 | 2,920 | 1,014 |

All the sample floorboards with the example sealers exceed (e.g., greatly exceed) the minimum value of 525 psi required by the Fruehauf industry standard for wet shear strength.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. A wood floor for truck trailers and containers, comprising:
a wood member including a plurality of floor boards;
wherein each of the floor boards include a plurality of wood strips joined together;
wherein opposing side surfaces of the wood strips are attached together with an adhesive;
wherein opposing end surfaces of the wood strips are secured together with a hook joint;
wherein the hook joint includes a sealer disposed within the hook joint about substantially all surfaces of the hook joint;
wherein the sealer is compatible with the adhesive; and
wherein the wood floor is free of a reinforced underlay such that the sealer is the sole moisture barrier at the hook joint.

2. The wood floor of claim 1, wherein the sealer includes a viscosity modifier.

3. The wood floor of claim 2, wherein the viscosity modifier includes a wood flour or a non-wood flour.

4. The wood floor of claim 2, wherein the sealer has a viscosity range between 1,000 cps and 1,200,000 cps at room temperature.

5. The wood floor of claim 1, wherein the sealer includes a water-based adhesive.

6. The wood floor of claim 1, wherein the sealer is selected from the group consisting of melamine urea formaldehyde, melamine formaldehyde, phenol formaldehyde, resorcinol formaldehyde, phenol resorcinol formaldehyde, crosslinking polyvinyl acetate, emulsion polymer isocyanate, polyisocyanate, polymeric methylene diphenyl diisocyanate, polyurethane, epoxy, acrylic, and combinations thereof.

7. The wood floor of claim 1, wherein the sealer includes a two-part emulsion polymer isocyanate.

8. The wood floor of claim 1, wherein the adhesive includes melamine urea formaldehyde, melamine formaldehyde, emulsion polymer isocyanate, crosslinking polyvinyl acetate, polyisocyanate, or combinations thereof.

9. The wood floor of claim 1, wherein the end joint is essentially impermeable to liquid water and water vapor.

10. The wood floor of claim 1, wherein the sealer is different from the adhesive.

11. A wood floor for truck trailers and containers, comprising:
a wood floor including a plurality of floor boards joined together;
wherein a reinforced underlay is disposed along a bottom surface of the floor boards;
wherein each of the floor boards are made from a plurality of wood strips that are joined together;
wherein the plurality of wood strips are bonded along their side surfaces with an adhesive;
wherein opposing end surfaces of the wood strips are secured together with a hook joint; and
a water based sealer disposed on substantially all surfaces within the hook joint to seal the hook joint so that the hook joint is essentially impermeable to liquid water and water vapor, wherein the sealer is compatible with and different from the adhesive.

12. A wood floor for truck trailers and containers, comprising:
a wood member including a plurality of floor boards;
wherein each of the floor boards include a plurality of wood strips joined together;
wherein opposing side surfaces of the wood strips are attached together with an adhesive;

wherein opposing end surfaces of the wood strips are secured together with a hook joint;
wherein the hook joint includes a sealer disposed within the hook joint about substantially all surfaces of the hook joint;
wherein the sealer is different from the adhesive; and
wherein the wood floor is free of a reinforced underlay such that the sealer is the sole moisture barrier at the hook joint.

* * * * *